United States Patent [19]

Müller

[11] Patent Number: 4,777,735

[45] Date of Patent: Oct. 18, 1988

[54] DEVICE FOR DEHYDRATING AND DRYING SOLIDS, PARTICULARLY PLASTICS GRANULATED UNDER WATER

[75] Inventor: Leo Müller, Bessenbach, Fed. Rep. of Germany

[73] Assignee: Automatik Apparate-Maschinenbau GmbH, Grossostheim, Fed. Rep. of Germany

[21] Appl. No.: 24,318

[22] Filed: Mar. 10, 1987

[30] Foreign Application Priority Data

Mar. 11, 1986 [DE] Fed. Rep. of Germany ....... 3608026

[51] Int. Cl.$^4$ .................................................. F26B 17/10
[52] U.S. Cl. ........................................ 34/57 E; 34/182
[58] Field of Search ............... 34/57 E, 182, 181, 225, 34/233, 227, 218

[56] References Cited

U.S. PATENT DOCUMENTS

| 3,817,696 | 6/1974 | Hereth | 34/57 E |
| 3,905,127 | 9/1975 | Davis | 34/182 |
| 4,285,142 | 8/1981 | Suzuki et al. | 34/57 E |
| 4,441,262 | 4/1984 | Gazzoni . | |
| 4,454,661 | 6/1984 | Klein et al. . | |

FOREIGN PATENT DOCUMENTS

| 3123592 | 12/1982 | Fed. Rep. of Germany . | |
| 3210974 | 10/1983 | Fed. Rep. of Germany . | |
| 215271 | 11/1984 | Fed. Rep. of Germany . | |
| 216195 | 12/1984 | Fed. Rep. of Germany . | |
| 249998 | 4/1976 | United Kingdom | 34/57 E |

Primary Examiner—Larry I. Schwartz

[57] ABSTRACT

This invention concerns a device for dehydrating and drying solids, particularly plastics granulated under water in the form of a granulate-water mixture on a curved screen by means of a stream of air that runs both in the direction through the water through the screen and along the screen, with the granulate-water mixture being supplied to the curved screen through a feed duct and being agitated turbulently by the flow energy of the air above the curved screen and being fed to a discharge duct at the end of the curved screen.

6 Claims, 4 Drawing Sheets

DEVICE FOR DEHYDRATING AND DRYING SOLIDS, PARTICULARLY PLASTICS GRANULATED UNDER WATER

DESCRIPTION OF THE PRIOR ART

A device of this kind is disclosed by German Pat. No. 2,126,069, in which a granulate-water mixture is fed to a curved screen above a feed duct almost tangentially, followed by an air feed zone covering a substantial region of the curved screen after the end of the feed duct, that is formed by the circumferential surface of a fan. Because of the rotation of the fan in the direction of flow of the granulate-water mixture above the curved screen, the air flow along this zone has both a circular transport component and also a radial component in the entire region of the zone, which imparts to the granulate a tendency to follow the curvature of the curved screen. The centrifugal force caused by this then brings about a centrifuging of the water and its passage through the curved screen.

FIELD OF THE INVENTION

The purpose of this invention is to increase the efficiency of the curved screen while avoiding moving parts, and thus to reduce the overall technical expense.

SUMMARY OF THE INVENTION

Such improvements are accomplished according to the invention by a tube with the granulate-water mixture fed to one of its ends and provided with at least one air feed slot extending axially approximately tangentially to the tube, provided with baffles oriented approximately tangentially to the tube running diagonally to the axial direction, which produce a stream of air running helically through the tube, with the tube having a length such that granulate fed to it is discharged from the other end of the tube after several revolutions, and the curved screen is designed as a curved section of the tube that extends axially essentially over the axial length of the revolutions.

Because of the multiple helical rotation of the granulate fed to the tube, it comes into contact with the curved screen over a relatively long distance, with entrained water being withdrawn. Because of this relatively long path, there is particularly intense drying. The motion of the granulate-water mixture along the helix is provided for by the air baffles, which impart renewed impetus to the granulate after each revolution of 360° when there is an air feed slot extending axially. This keeps the granulate fed to the tube in rapid helical motion from one end of the tube to the other until the practically dry granulate is discharged from the outlet end of the tube, without the necessity of moving parts for this purpose.

Preferably, the air feed slot is located in front of the curved screen with the air stream in a circular direction, so that the granulate-water mixture is transported above the curved screen. This imparts to the granulate-water mixture its impetus for the helical revolving motion just before the curved screen.

Depending on the amount of granulate-water mixture introduced, and depending on the diameter of the tube, it can be beneficial to locate another air feed slot with a circular air stream direction beyond the curved screen, which then transports the granulate-water mixture further, particularly above a continuous curved section of the tube.

It is beneficial to locate both the curved screen and the air feed slot or slots in boxes, with the box associated with the air feed slot or slots being connected to an air feed duct, and the box containing the curved screen being provided with an air outlet and a water outlet. This results in a compact design wherein the two boxes can be connected to one another in an essentially symmetrical arrangement.

To avoid an undesirable essentially axial motion of the granulate-water mixture in the pipe, baffles with the shape of circular segments overlapping in axial projection are suitably fitted so that their surfaces essentially follow the helical air stream. Granulate grains moving essentially axially are then held back by the baffles and introduced into the helical air stream.

BRIEF DESCRIPTION OF THE DRAWINGS

An example of embodiment of the invention is illustrated in the FIGS. The FIGS. show:

FIG. 1 shows the device in schematic illustration in perspective. The tube 1 is shown, which is bisected approximately axially and is thereby divided into the curved screen 2 and the continuous curved section 3. Both the curved screen 2 and the continuous curved section 3 extend axially over the entire length of the tube 1. The air feed slots 4 and 5 extend along the axial separations between the curved screen 2 and the continuous curved section 3, with the air feed slot 4 therefore being located before the curved screen 2 in the circular direction of the air flow (see below). The air baffles 6 are located in the air feed slot 4 (see also FIGS. 2 to 4), which give a direction to a stream of air entering through the air feed slot 4, because of their diagonal orientation (see FIG. 3), such that the helical air stream 7 is produced in the tube 1 (illustrated by the broken line inside the tube 1).

Figure 1:
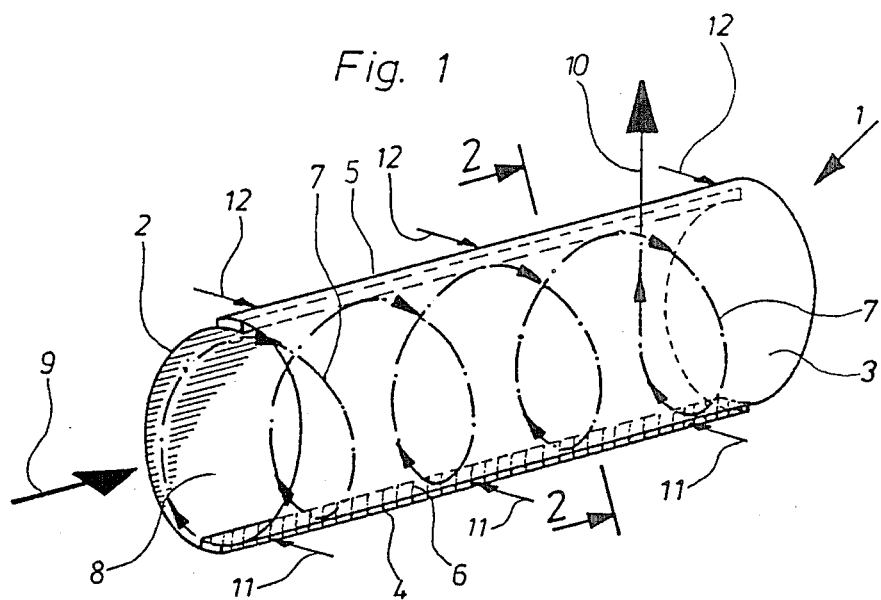
FIG. 1 is the tube in schematic illustration with the granulate-water mixture in helical motion.

The direction of the air feed slot 4 running essentially tangentially to the tube 1 provides for an air stream fed to the air feed slot 4 producing a circular air flow inside the tube 1 of such velocity that granulate-water mixture (illustrated by the arrow) introduced at the front face 8 of the tube 1 is agitated turbulently and circularly over the inner wall of the tube 1, with the granulate-water mixture being guided above the curved screen 2 directly beyond the air feed slot 4. Because of centrifugal forces that occur, water adhering to the granulate in the area of the curved screen 2 is centrifuged off in a known way, as customary with a curved screen. Air also escapes to the outside radially through the curved screen, which is also desirable in the sense of an entrainment of water. Because of the baffles 6, the air stream passing through the air feed slot 4 is given an axial component along with the tangential direction, which results in the helical curve 7 of the air stream and thus also of the granulate-water mixture entrained by it inside the tube 1. This helical air stream 7 is given a renewed impetus each time after passing through 360° by the air escaping from the air feed slot 4, so that the helical motion of the granulate-water stream 7 is maintained up to the end of tube 1. An outlet, not shown in FIG. 1, is provided radially upward at the end of the tube 1, through which the granulate, which is now mostly dry, illustrated by the arrow 10, is discharged upward. This is desirable to gain height.

In accordance with FIG. 1, besides the air feed slot 4, the air feed slot 5 is also provided just beyond the curved screen 2. An air stream is likewise fed to the inside of the tube 1 through the air feed slot 5, which likewise imparts an impetus to the arriving granulate at the end of the curved screen 2. This keeps the granulate-water mixture circulating in the tube 1 at a high velocity of motion.

It should be pointed out that the air feed slot 5 is necessary only when a particularly high circumferential velocity of the granulate-water mixture in the tube 1 is necessary, especially if the tube 1 has a large diameter. This depends on the particular degree of dryness desired. It may be sufficient for only the air feed slot 4 to be provided with the air baffles 6 if this imparts a sufficiently strong axial component to the air stream 7 in the tube 1. If this is not adequate, air baffles can also be provided in the air feed slot 5.

Figure 2:
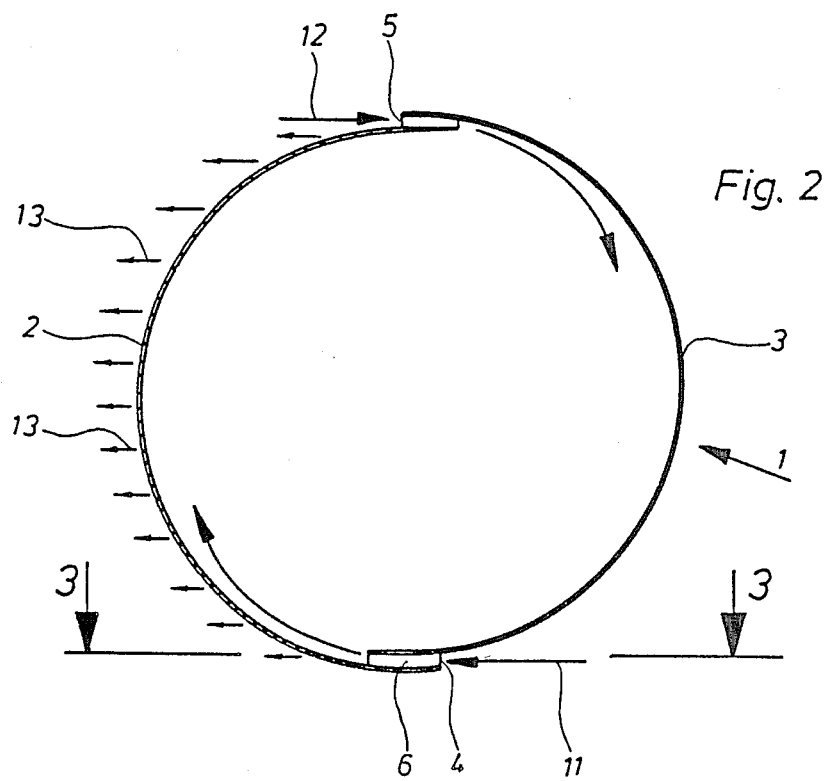
FIG. 2 is the tube of FIG. 1 viewed from the front face.

FIG. 2 shows the arrangement of FIG. 1 viewed from the front face. As shown, the curved screen 2 and the continuous curved section 3 follow one another in the wall of the tube 1, above the air feed slots 4 and 5 in each case. The air stream fed to the air feed slots 4 and 5 is identified by the arrows 11 and 12. The water centrifuged from the granulate and the air passing through the curved screen 2 are indicated by the arrows 13.

Figure 3:
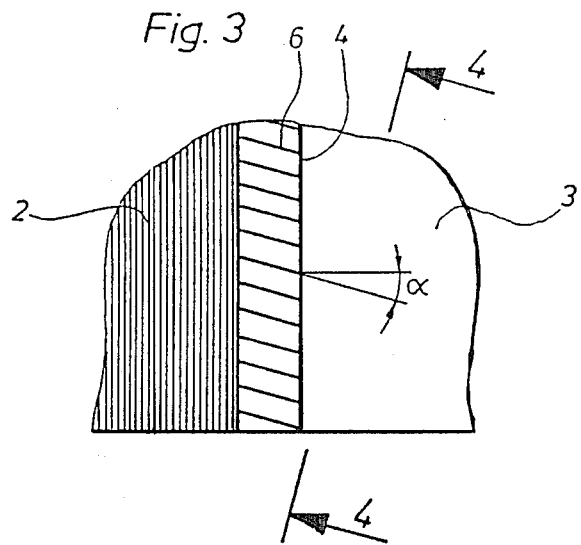
FIG. 3 is a section through the line 3—3 of FIG. 2 showing the air baffles.

The arrangement of baffles 6 in the air feed slot 4 is illustrated in FIG. 3 in cross section along the line 3—3 of FIG. 2. The air baffles 6 in this case are inclined at an angle perpendicular to the longitudinal direction of the air feed slot 4 and can be approximately 15° to 30°. This sloping position of the air baffles 6 produces the aforementioned axial component of the air stream 7.

Figure 4:
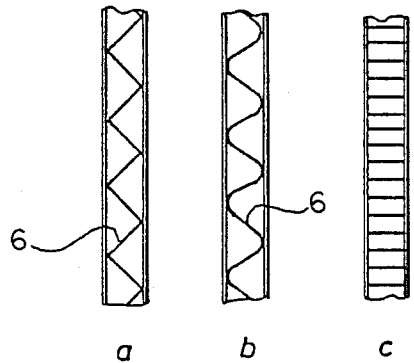
FIGS. 4a, 4b and 4c are various modifications of the design of the air baffles.

FIGS. 4a, 4b and 4c show various embodiments with regard to the design of the air baffles 6, with these Figures each showing an arrangement in cross section along the line 4—4 of FIG. 3. The inclined position of the cross section 4—4 was chosen in order to show the air baffles 4 from their faces to simplify the illustration, with the inclined position of the cross section 4—4 therefore corresponding to the angle. In accordance with FIG. 4a, the air baffles 6 are placed in zig-zag arrangement, as a wavy line in FIG. 4b, and a rectangular honeycomb in FIG. 4c.

Figure 5:
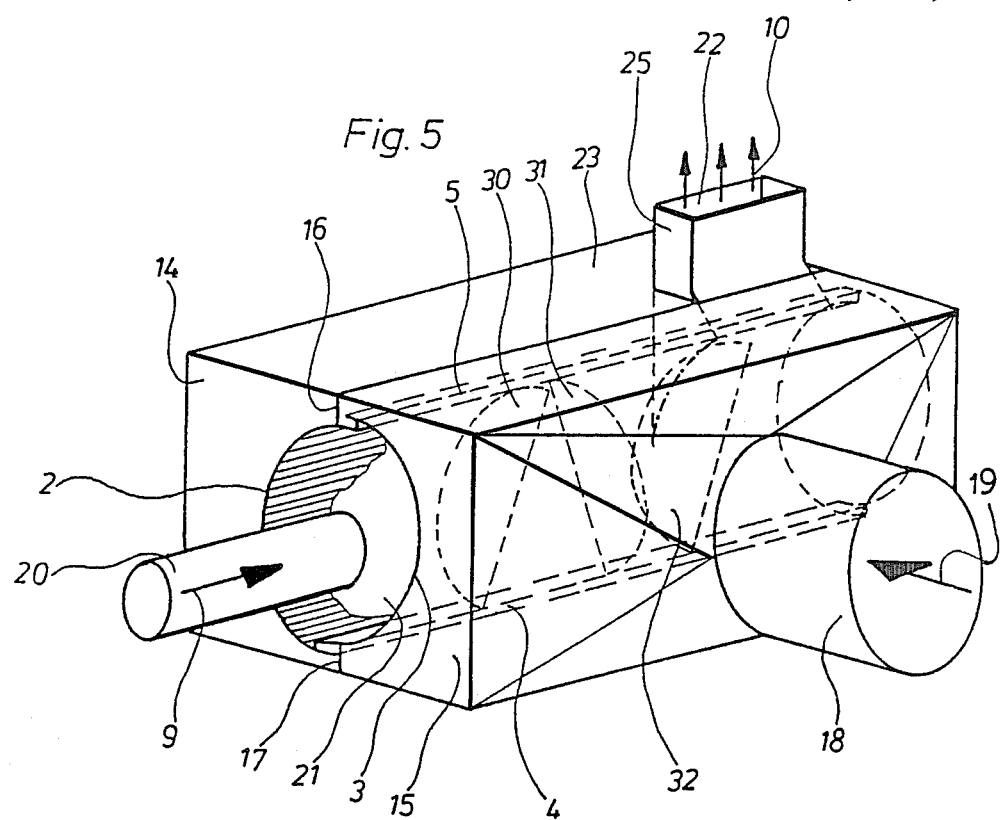
FIG. 5 is the device with a tube accommodated in a housing.

FIG. 5 illustrates the arrangement of FIG. 1 together with a housing. The tube, including the curved screen 2, continuous curved section 3, and the two air feed slots 4 and 5 in this case, is accommodated in a housing formed from the two boxes 14 and 15, with the box 14 holding the curved screen 2 and the box 15 holding the continuous curved section 3. The wall 16 of the box 15 facing the curved screen 2 extends beyond the inlet opening of the air feed slot 5, while the corresponding wall 17 ends at the inlet side of the air feed slot 4. The box 15 thus encloses a chamber having walls 16 and 17 which permit the entry of air from the box 15 to the air feed slots 4 and 5. For this purpose, the box 15 is provided with the air feed duct 18. The air stream fed to it is identified by the arrow 19. The air that passes through the air feed duct 18 reaches the air feed slots 4 and 5 through the inner space of the box 15, whereby the air fed through the air feed slots 4 and 5 can then exert the action described in connection with FIG. 1.

The box 14 forms an inner chamber enclosing the curved screen 2, into which the water centrifuged through the curved screen 2 and the air passing therethrough can enter (see flow path 13 in FIG. 2). This air is fed to the outside through the back wall of the box 14, not shown in FIG. 5, which is explained in detail in FIG. 6. The water which collects at the bottom of the box 14 because of gravity is tapped off through a water outlet in the bottom of the box 14, not shown in FIG. 5, which is likewise explained in detail in connection with FIG. 6.

The granulate-water mixture, shown by the arrow 9, is fed to the system through the inlet tube 20 that ends in the front wall 21, which is part of both the box 14 and the box 15. The mostly dry granulate is carried off from the system through the outlet shaft 22. The outlet shaft 22 passes through the cover 23 of the box 14 and is lengthened toward the tube inside the box 14 so that this extension connects to a side opening in the tube 1 that is protected from the curved screen 2. The tube in this way is given an outlet in its wall determined by the curved screen 2, which reaches from the wall 16 to the point of contact 24 of a perpendicular tangent to the curved screen 2 (see FIG. 6), with the front wall 25 of the outlet shaft 22 reaching through the inner chamber of the box 14 to the wall of the tube, i.e., in this case to the curved screen 2 ending at this point in the axial direction. The opening area 34 of the tube shown in FIG. 6 with a broken line therefore remains free, so that granulate centrifuged upward in this area, which is already almost dry, rises here through the outlet shaft 22 and can be carried off through it.

An elbow not shown in this FIG. can be connected to the outlet shaft 22 to prevent any granulate centrifuged up in the tube 22 from being able to fall back.

A mode of action of the system of FIG. 5 by which the granulate-water mixture 9 passes through the inlet tube 20 and reaches the inner chamber tube formed by the curved screen 2 and the continuous curved section 3, is then whirled around helically in the manner shown in FIG. 1, and is then discharged separately from one another, specifically the water with a portion of the air through a water outlet (not shown in FIG. 5) and an air outlet (see FIG. 6), and the granulate 10 with air through the outlet shaft 22.

Figure 6:
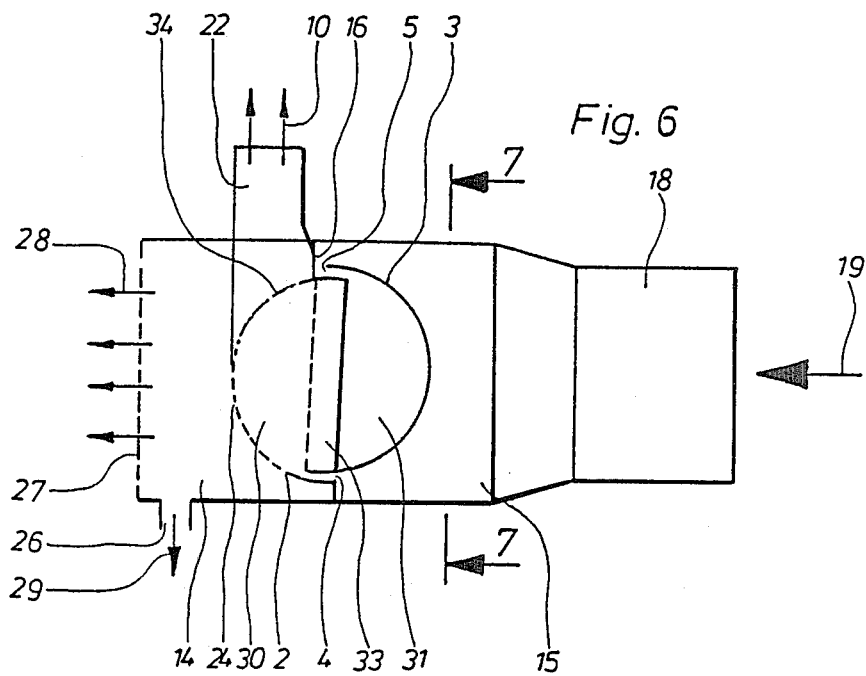
FIG. 6 is the arrangement of FIG. 5 viewed from the front face.

FIG. 6 shows the arrangement of FIG. 5 in schematic illustration viewed from the front face. It is clear that the box 14 contains the water outlet 26 at the bottom and a so-called droplet separator 27 in the area of its rear wall, which consists essentially in a known manner of a perforated wall. The escaping air is identified here with the arrow 28 and the escaping water with the arrow 29.

The baffles 30, 31 and 32 with circular segment shapes are also shown in FIG. 5; they are inserted as diagonal sections in the tube formed from the curved screen 2 and the continuous curved section 3. Their diagonal position can also be seen in FIG. 7, which will be discussed in detail below. In accordance with FIG. 6, in which the baffles 30 and 31 are shown, they overlap in the projection in the overlap region 33. The diagonal positions of the baffles 30, 31 and 32 are matched to the pitch of the helical flow 7 (see FIG. 1), so that they do not hinder this flow. However, because of their overlapping in the overlap region 33, they prevent a direct axial passage of granulate, which is deflected upon striking a baffle 30, 31 or 32, and is fed to the circulating air stream.

Figure 7:
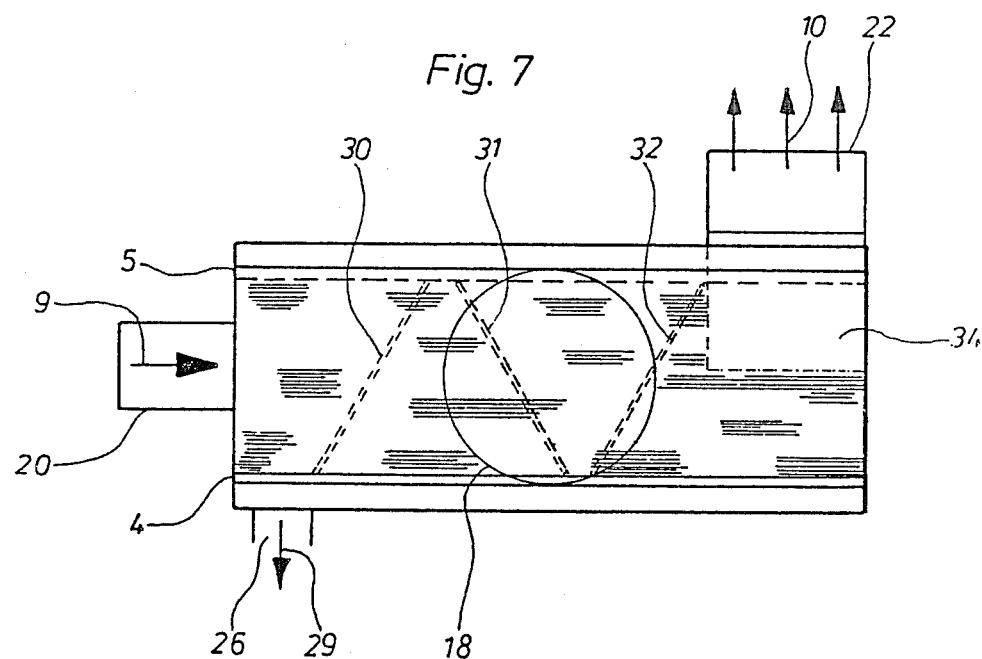
FIG. 7 is the arrangement of FIG. 5 viewed from the side in schematic illustration.

FIG. 7 shows the system of FIG. 6 in schematic illustration as a cross section along the line 7—7 from FIG. 6. The diagonal positions of the baffles 30, 31 and 32 are clearly apparent from FIG. 7. FIG. 7 also shows the opening area 34 below the outlet shaft 22, by which the shaft is connected to the tube in the area of the curved screen. The curved screen is also indicted schematically by the axial dashes, which shows that the curved screen has a cutout corresponding to the opening area 34.

It is apparent that modifications and changes can be made within the spirit and scope of the present invention, but it is my intention only to be limited by the scope of the appended claims.

As my invention I claim:

1. A device for dehydrating and drying solids, particularly plastics granulated under water, said solids being dispersed in the form of a granulate-water mixture and moving in front of a curved screen by means of a stream of air that flows both through the screen passing the water, and also along the screen, said granulate-water mixture being supplied to the curved screen through a feed duct and being agitated turbulently by the flow of energy of the air above the curved screen and being fed to an outlet duct at the end of the curved screen, said device including:
   a tube; and
   means disposed at one of the ends of said tube to receive the granulate-water mixture; and
   at least one air feed slot disposed on said tube, said slot extending axially and oriented approximately tangentially to said tube; and
   air baffles extending diagonally to the axis of said tube, whereby a stream of air runs helically through said tube, said tube having a length such that granulate fed to it is discharged from the other end thereof after several revolutions, and
   said curved screen having a radius substantially the same as the curved section of said tube, said screen extending axially essentially over the axial length of said tube.

2. The device according to claim 1 further including an the air feed slot being disposed in the direction of the flow of air in front of said curved screen to transport the granulate-water mixture essentially above the curved screen.

3. The device according to claim 2, further including a second air feed slot positioned beyond the curved screen in the direction of the flow of air to transport the granulate-water mixture above a continuous curved section of the tube.

4. The device according to claim 2, wherein said curved screen and said air feed slot or slots are each positioned in a box, and one of said boxes is correlated with the air feed slot or slots and is connected to an air feed duct and the other of said boxes contains said curved screen and is provided with an air outlet and a water outlet.

5. The device according to claim 3, wherein said curved screen and said air feed slot or slots are each positioned in a box, and one of said boxes is correlated with the air feed slot or slots and is connected to an air feed duct and the other of said boxes contains said curved screen and is provided with an air outlet and a water outlet.

6. A device for dehydrating and drying solids, particularly plastics granulated under water, said solids being dispersed in the form of a granulate-water mixture and moving in front of a curved screen by means of a stream of air that flows both through the screen passing through the water, and also along the screen, said granulate-water mixture being supplied to the curved screen through a feed duct and being agitated turbulently by the flow energy of the air above the curved screen and being fed to an outlet duct at the end of the curved screen, said device including:
   a tube; and
   means disposed at one of the ends of said tube to receive the granulate-water mixture; and
   at least one air feed slot disposed on said tube and extending axially and oriented approximately tangentially to said tube; and
   air baffles extending diagonally to the axis of said tube, whereby a stream of air runs helically through said tube, said tube having a length such that granulate fed to it is discharged from the other end thereof after several revolutions; and
   said curved screen having a radius substantially the same as the curved section of said tube, said screen extending axially essentially over the axial length of said tube; and
   a plurality of baffles formed of circular segments overlapping an axial projection and arranged so that their surfaces essentially follow the helical air stream.

* * * * *